US008458767B2

(12) United States Patent
Riley et al.

(10) Patent No.: US 8,458,767 B2
(45) Date of Patent: Jun. 4, 2013

(54) METHODS, SYSTEMS, AND COMPUTER READABLE MEDIA FOR ENHANCED SERVICE DETECTION AND POLICY RULE DETERMINATION

(75) Inventors: Yusun Kim Riley, Weston, MA (US); Uri Baniel, Buffalo Grove, IL (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/042,294

(22) Filed: Mar. 7, 2011

(65) Prior Publication Data
US 2011/0219426 A1 Sep. 8, 2011

Related U.S. Application Data

(60) Provisional application No. 61/310,872, filed on Mar. 5, 2010.

(51) Int. Cl.
*G06F 17/00* (2006.01)
(52) U.S. Cl.
USPC .............................................................. 726/1
(58) Field of Classification Search
USPC .................... 726/1, 11, 22–24; 713/151, 153
See application file for complete search history.

(56) References Cited

U.S. PATENT DOCUMENTS

| 6,141,686 | A | 10/2000 | Jackowski et al. |
| 6,651,101 | B1 | 11/2003 | Gai et al. |
| 6,661,780 | B2 | 12/2003 | Li |
| 6,880,005 | B1 | 4/2005 | Bell et al. |
| 7,209,962 | B2 | 4/2007 | Boden |
| 7,289,498 | B2 * | 10/2007 | Yu et al. ......................... 370/389 |
| 7,581,249 | B2 | 8/2009 | Bussiere et al. |
| 7,719,966 | B2 | 5/2010 | Luft et al. |
| 7,940,683 | B2 * | 5/2011 | Dolganow et al. ............ 370/249 |
| 8,146,133 | B2 | 3/2012 | Moon et al. |
| 8,159,941 | B2 * | 4/2012 | Dolganow et al. ............ 370/230 |
| 8,250,646 | B2 * | 8/2012 | Zheng ............................. 726/13 |

(Continued)

FOREIGN PATENT DOCUMENTS

| EP | 2 045 974 A1 | 4/2009 |
| KR | 10-2006-0028042 | 3/2006 |

(Continued)

OTHER PUBLICATIONS

Notification of Transmittal of the International Search Report and the Written Opinion of the International Searching Authority, or the Declaration for International Application No. PCT/US2011/027427 (Nov. 15, 2011).

(Continued)

*Primary Examiner* — Beemnet Dada
(74) *Attorney, Agent, or Firm* — Jenkins, Wilson, Taylor & Hunt, P.A.

(57) ABSTRACT

Methods, systems, and computer readable media for enhanced service detection and policy rule determination are disclosed. According to one method, a policy and charging rules function (PCRF) node requests, from a deep packet inspection (DPI) node notification of detection of traffic relating to a service. The DPI node identifies at least one traffic classifier usable to detect traffic corresponding to the service, uses the traffic classifier to detect traffic corresponding to the service, and notifies the PCRF of the detection and of the traffic classifier. The PCRF node receives the at least one traffic classifier, determines a policy rule based on the at least one traffic classifier, and communicates the policy rule to a policy enforcement node.

25 Claims, 3 Drawing Sheets

U.S. PATENT DOCUMENTS

| | | | |
|---|---|---|---|
| 2002/0143914 | A1 | 10/2002 | Cihula |
| 2003/0208523 | A1 | 11/2003 | Gopalan et al. |
| 2004/0111519 | A1 | 6/2004 | Fu et al. |
| 2005/0088977 | A1 | 4/2005 | Roch et al. |
| 2006/0013191 | A1 | 1/2006 | Kavanagh |
| 2006/0233101 | A1 | 10/2006 | Luft et al. |
| 2007/0004393 | A1 | 1/2007 | Forsberg et al. |
| 2007/0066286 | A1 | 3/2007 | Hurtta |
| 2007/0159976 | A1 | 7/2007 | Dekeyzer et al. |
| 2007/0220251 | A1 | 9/2007 | Rosenberg et al. |
| 2007/0242692 | A1 | 10/2007 | Limb et al. |
| 2007/0286117 | A1 | 12/2007 | Balasubramanian et al. |
| 2008/0046963 | A1 | 2/2008 | Grayson et al. |
| 2008/0076388 | A1 | 3/2008 | Nochimowski et al. |
| 2008/0137541 | A1 | 6/2008 | Agarwal et al. |
| 2008/0201772 | A1 | 8/2008 | Mondaeev et al. |
| 2008/0232376 | A1 | 9/2008 | Huang et al. |
| 2008/0276305 | A1 | 11/2008 | Chan et al. |
| 2008/0313708 | A1 | 12/2008 | Khan et al. |
| 2009/0089418 | A1 | 4/2009 | Saha et al. |
| 2009/0177650 | A1 | 7/2009 | Petersson et al. |
| 2009/0196225 | A1 | 8/2009 | Avila Gonzalez et al. |
| 2009/0227231 | A1 | 9/2009 | Hu et al. |
| 2009/0228956 | A1* | 9/2009 | He et al. .......................... 726/1 |
| 2009/0285225 | A1 | 11/2009 | Dahod |
| 2009/0307028 | A1 | 12/2009 | Eldon et al. |
| 2009/0323536 | A1 | 12/2009 | Liu et al. |
| 2010/0040047 | A1 | 2/2010 | Zamora et al. |
| 2010/0121960 | A1 | 5/2010 | Baniel et al. |
| 2010/0185488 | A1 | 7/2010 | Hogan et al. |
| 2010/0235877 | A1 | 9/2010 | Hu et al. |
| 2011/0022702 | A1 | 1/2011 | Riley et al. |
| 2011/0041182 | A1* | 2/2011 | Stenfelt .......................... 726/23 |
| 2011/0167471 | A1 | 7/2011 | Riley et al. |
| 2011/0170412 | A1* | 7/2011 | Ramadas et al. .............. 370/235 |
| 2011/0202653 | A1 | 8/2011 | Riley et al. |
| 2011/0225280 | A1 | 9/2011 | Delsesto et al. |
| 2011/0225306 | A1 | 9/2011 | Delsesto et al. |
| 2011/0225309 | A1 | 9/2011 | Riley et al. |
| 2012/0084425 | A1 | 4/2012 | Riley et al. |
| 2012/0131165 | A1 | 5/2012 | Baniel et al. |

FOREIGN PATENT DOCUMENTS

| | | |
|---|---|---|
| KR | 10-2009-0027861 | 3/2009 |
| WO | WO 2008/000287 A1 | 1/2008 |
| WO | WO 2008/114217 A1 | 9/2008 |
| WO | WO 2009/149341 A2 | 12/2009 |
| WO | WO 2010/086013 A1 | 8/2010 |
| WO | WO 2011/011790 A2 | 1/2011 |
| WO | WO 2011/082036 A2 | 7/2011 |
| WO | WO 2011/100684 A2 | 8/2011 |
| WO | WO 2011/115991 A2 | 9/2011 |

OTHER PUBLICATIONS

Notification of Transmittal of the International Search Report and the Written Opinion of the International Searching Authority, or the Declaration for International Application No. PCT/US2011/028520 (Oct. 31, 2011).

Notification of Transmittal of the International Search Report and the Written Opinion of the International Searching Authority, or the Declaration for International Application No. PCT/US2011/024753 (Oct. 28, 2011).

Notification of Transmittal of the International Search Report and the Written Opinion of the International Searching Authority, or the Declaration for International Patent Application No. PCT/US2010/061589 (Sep. 26, 2011).

Commonly-assigned, co-pending U.S. Appl. No. 13/225,390 for "Method and System for Providing Mobility Management in Network", (Unpublished, filed on Sep. 2, 2011).

Non-Final Official Action for U.S. Appl. No. 12/621,190 (Aug. 3, 2011).

Non-Final Official Action for U.S. Appl. No. 12/479,179 (Aug. 2, 2011).

Commonly-assigned, co-pending U.S. Appl. No. 13/157,052 for "Methods, Systems, and Computer Readable Media For Providing Nested Policy Configuration in a Communications Network", (Unpublished, filed on Jun. 9, 2011).

Notification of Transmittal of the International Search Report and the Written Opinion of the International Searching Authority, or the Declaration for International Application No. PCT/US2010/043258 (Feb. 28, 2011).

Restriction Requirement for U.S. Appl. No. 12/479,179 (Feb. 8, 2011).

"3rd Generation Partnership Project; Technical Specification Group Core Network and Terminals; Policy and Charging Control over Rx reference point (Release 9)," 3GPP TS 29.214, V9.3.0, pp. 1-45 (Mar. 2010).

"Universal Mobile Telecommunications System (UMTS); LTE; Policy and charging control over Rx reference point (3GPP TS 29.214 version 9.2.0 Release 9)," ETSI TS 129 214, V9.2.0 (Jan. 2010).

"Universal Mobile Telecommunications System (UMTS); LTE; Policy and charging control over Gx reference point (3GPP TS 29.212 version 9.1.0 Release 9)," ETSI TS 129 212, V9.1.0 (Jan. 2010).

Notification of Transmittal of the International Search Report and the Written Opinion of the International Searching Authority, or the Declaration for International Application No. PCT/US2009/046395 (Dec. 28, 2009).

3rd Generation Partnership Project, Technical Specification Group Core Network and Terminals; Policy and Charging Control Over Gx reference point (Release 9), 3GPP TS 29.212, V9.1.0, pp. 1-106 (Dec. 2009).

"Chapter 1: Overview of GPRS and UMTS," Cisco GGSN release 9.0 Configuration Guide, Cisco IOS Release 12.4(22)YE, pp. 1-1-1-16 (Aug. 4, 2009).

"Introduction to Diameter," Wikipedia, pp. 1-12 (Downloaded from the Internet on May 15, 2009).

"Diameter Credit-Control Application," Wikipedia, pp. 1-7 (Downloaded from the Internet on May 13, 2009).

"Diameter (Protocol)," Wikipedia, pp. 1-8 (Downloaded from the Internet on May 13, 2009).

"File: GPRS Core Structure.phg," Wikipedia, pp. 1-3 (Downloaded from the Internet on May 13, 2009).

"GPRS Core Network," Wikipedia, pp. 1-6 (Downloaded from the Internet on May 13, 2009).

"GPRS Network Architecture," DenMasBroto, pp. 1-2 (Downloaded from the Internet on May 13, 2009) (May 28, 2008).

Agilent Technologies, "Understanding DSLAM and BRAS Access Devices," White Paper, pp. 1-15 (2006).

Hakala et al., "Diameter Credit-Control Application," Network Working Group RFC 4006, pp. 1-114 (Aug. 2005).

Zhou et al., "Prophet Address Allocation for Large Scale MANETs," Ad Hoc Networks, vol. 1, Issue 4, pp. 423-434 (Nov. 2003).

Calhoun et al., "Diameter Base Protocol," RFC 3588, pp. 1-147 (Sep. 2003).

Ponnappan et al., "A Policy Based QoS Management System for the IntServ/DiffServ Based Internet," Policies for Distributed Systems and Networks, pp. 159-168 (2002).

"GPRS Tutorial," MorganDoyle Limited, pp. 1-13 (Publication Date Unknown).

Notice of Allowance and Fee(s) Due for U.S. Appl. No. 13/225,390 (Oct. 9, 2012).

Non-Final Official Action for U.S. Appl. No. 12/479,179 (Sep. 13, 2012).

European Search Report for European Patent Application No. EP 09 75 9499 (Sep. 12, 2012).

Non-Final Official Action for U.S. Appl. No. 12/973,186 (Aug. 24, 2012).

Applicant-Initiated Interview Summary for U.S. Appl. No. 13/225,390 (Aug. 13, 2012).

Notice of Allowance and Fee(s) Due for U.S. Appl. No. 12/621,190 (May 29, 2012).

Non-Final Official Action for U.S. Appl. No. 13/225,390 (May 14, 2012).

Communication of European publication number and information on the application of Article 67(3) EPC for European Application No. 10803020.6 (May 4, 2012).
Final Official Action for U.S. Appl. No. 12/479,179 (Apr. 10, 2012).
Applicant-Initiated Interview Summary for U.S. Appl. No. 12/621,190 (Feb. 7, 2012).

3rd Generation Partnership Project, "Technical Specification Group Core Network and Terminals; Policy and Charging Control over Gx Reference Point," 3GPP TS 29.212, V8.0.0, Release 8 (May 2008).

* cited by examiner

METHODS, SYSTEMS, AND COMPUTER READABLE MEDIA FOR ENHANCED SERVICE DETECTION AND POLICY RULE DETERMINATION

PRIORITY CLAIM

This application claims the benefit of U.S. Provisional Patent Application Ser. No. 61/310,872, filed Mar. 5, 2010; the disclosure of which is incorporated herein by reference in its entirety.

TECHNICAL FIELD

The subject matter described herein relates to detection of traffic relating to services. More particularly, the subject matter described herein relates to methods, systems, and computer readable media for enhanced service detection and policy rule determination.

BACKGROUND

In fixed and mobile communications networks, the ability to detect and act on traffic relating to specific services can be limited by the nodes that manage traffic relating to those services. For example, in mobile communications networks, the gateway GPRS support node (GGSN) may only be capable of detecting traffic of open systems interconnect (OSI) layer 4 and below and implementing policy rules based on those layers. Thus, the ability of such GGSN nodes to detect higher layer traffic, such as web application traffic, Skype traffic, YouTube traffic, or voice over IP traffic may be limited. As a result, a network operator may be unable to provision specific policies related to traffic of a particular application type.

Other GGSN nodes may be capable of detecting OSI layer 5 and higher traffic. However, there is no current mechanism for the GGSN to dynamically obtain a policy enforcement rule in response to detecting traffic relating to a specific application or service. Accordingly, there exists a need for methods, systems, and computer readable media for enhanced service detection and policy rule determination.

SUMMARY

Methods, systems, and computer readable media for enhanced service detection and policy rule determination are disclosed. According to one method, a policy and charging rules function (PCRF) node requests, from a deep packet inspection (DPI) node notification of detection of traffic relating to a service. The DPI node identifies at least one traffic classifier usable to detect traffic corresponding to the service, uses the at least one traffic classifier to detect traffic corresponding to the service, and notifies the PCRF of the detection and of the at least one traffic classifier. The PCRF node receives the at least one traffic classifier, determines a policy rule based on the at least one traffic classifier, and communicates the policy rule to a policy enforcement node.

As used herein, the term "node" refers to a physical computing platform including one or more processors and memory.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
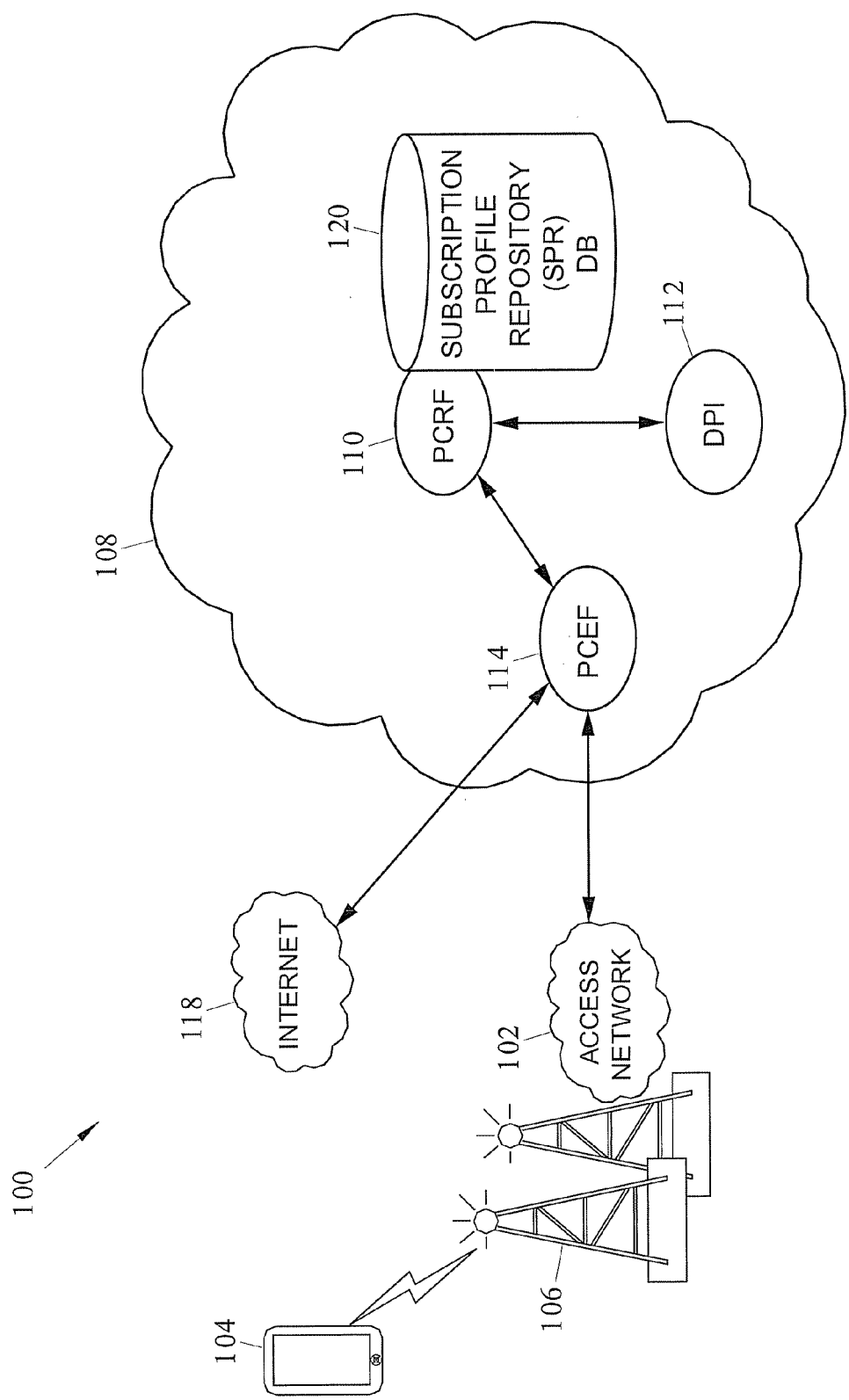
FIG. 1 is a network diagram illustrating a system for enhanced service detection and policy rule determination according to an embodiment of the subject matter described herein.

Methods, systems, and computer readable media for enhanced service detection and policy rule determination are disclosed. FIG. 1 is a network diagram illustrating an exemplary system for enhanced service detection and policy rule determination according to an embodiment of the subject matter described herein. Referring to FIG. 1, network environment 100 may include access network 102. Access network 102 may include nodes, functions, devices, and/or components for providing user equipment (UE) 104 access to services, functions, or devices in one or more networks. In one embodiment, access network 102 may be a radio access network (RAN). For example, access network 102 may be a global system for mobile communications (GSM) RAN (GRAN), a general packet radio service (GPRS) access network, a universal mobile telecommunications system (UMTS) RAN (UTRAN), an evolved UTRAN (eUTRAN), an Internet protocol (IP) connectivity access network (IP-CAN), a code division multiple access (CDMA) network, an evolution-data optimized (EV-DO) network, a wideband CDMA (WCDMA) network, a high speed packet access (HPSA) network, an evolved HPSA (EHPSA+) network, or a long term evolution (LTE) access network. Access network 102 may include one or more transceiver nodes 106 for communicating with UE 104. UE 104 may include a computer, a pager, a mobile phone, a smartphone, a wireless modem, or other devices through which a subscriber accesses network services.

Network environment 100 may further include a carrier network 108. Carrier network 108 may include different types of nodes such as a bearer binding and event reporting function (BBERF) node and/or an application function (AF) node (not shown). An AF node may be, for example, an application server (AS), a multimedia resource function (MRF), or a proxy call session control function (P-CSCF).

Carrier network 108 may also include a PCRF node 110. PCRF node 110 is a centralized node that can act as a policy decision point for carrier network 108. PCRF node 110 may take operator defined service policies, subscription information pertaining to a user, and other data into account to build policy decisions. Policy decisions may be formulated as policy control and charging (PCC) rules. PCC rules may contain information about user plane traffic expressed as a packet classifier, or filter. For example, a packet classifier make take the form of an IP five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). All IP packets matching a packet classifier of a PCC rule may be designated a service data flow (SDF) or service event.

According to an aspect of the subject matter described herein, PCRF node 110 may store identifiers for services without knowing the signatures or traffic classifiers for those services. For example, PCRF node 110 may be provisioned with the following service identifiers:

TABLE 1

PCRF Service Identifiers

| PCRF Service Identifier |
| --- |
| VoIP |
| YouTube |
| Skype |

In Table 1, it can be seen that PCRF node 110 may store identifiers for services that are of OSI layer 5 and higher. However, PCRF node 110 may not be provisioned with the signatures, i.e., the traffic classifiers, for detecting traffic relating to such services.

Accordingly, deep packet inspection (DPI) node 112 may store a table that maps service identifiers, such as those illustrated in Table 1, to traffic classifiers or signatures relating to such services. Table 2 shown below illustrates exemplary traffic classifier data that may be stored and/or dynamically determined by DPI node 112.

TABLE 2

DPI-Determined Mappings Between Service Identifiers and Classifiers

| Service Identifier | Traffic Classifiers |
| --- | --- |
| VoIP | Endpoint IP addresses dynamically determined from SDP signaling |
| YouTube | www.youtube.com |
| Skype | Dynamically changing endpoint IP addresses and ports |

As can be seen from Table 2 above, DPI node 112 may determine and/or store mappings between service identifiers that are used by PCRF node 110 and the corresponding traffic classifiers that may be used to detect such traffic and to generate policy rules based on such traffic that are enforceable by a policy enforcement node, such as policy charging and enforcement function (PCEF) node 114 illustrated in FIG. 1. DPI node 112 may be statically provisioned by the network operator with some traffic classifiers. Other traffic classifiers may be dynamically determined by DPI node 112 through monitoring and analysis of network traffic.

In Table 2, the traffic classifiers for the service identifier "VoIP" may be determined dynamically by DPI node 112 through analysis of SDP signaling used to set up a VoIP call involving a specific user. The traffic classifier for the service identifier "YouTube" is the URL for YouTube, which may be a static traffic classifier stored by DPI node 112. The traffic classifiers for the service identifier "Skype" may include the dynamically changing endpoint IP addresses and ports that are associated with the Skype call. Because the IP addresses and ports change during a Skype call, DPI node 112 may continually update its traffic classifiers to detect the traffic and to communicate updated traffic classifiers to PCRF node 110.

PCRF node 110 can instruct DPI node 112 to notify PCRF node 110 when DPI node 112 detects traffic relating to a specific service type. DPI node 112 would then use its stored or dynamically determined traffic classifiers to detect traffic relating to the specific service type. Once DPI node 112 detects traffic relating to the service type, DPI node 112 may communicate an indication that the traffic has been detected and traffic classifiers corresponding to the traffic to PCRF node 110. Upon receiving the notification and the traffic classifiers, PCRF node 110 can dynamically formulate a rule for that service using the traffic classifiers and communicate the rule to PCEF node 114. PCEF node 114 can then enforce policies specific to service type. For example, PCEF node 114 may enforce policies based on the website that a user accesses in Internet 118 to provide different bandwidths for different websites.

Also illustrated in FIG. 1 is a subscription profile repository (SPR) 120, which stores details regarding each subscriber's service. For example, subscription profile repository 120 may store the download bandwidth to which a user is generally entitled so that PCRF node 110 can determine the appropriate policies to apply to the user. In general, a service specific policy implemented by PCRF node 110 would not be inconsistent with a policy stored for the user within subscription profile repository 120. That is, the service specific policies implemented by PCRF node 110 are intended to fine-tune the user's network access policy based on the service being accessed. However, the subject matter described herein is not limited to implementing service specific policies that are consistent with policies stored in subscription profile repository 120. In an alternate example, service specific policy may be inconsistent with an override by the policy stored by subscription profile repository 120.

Figure 2:
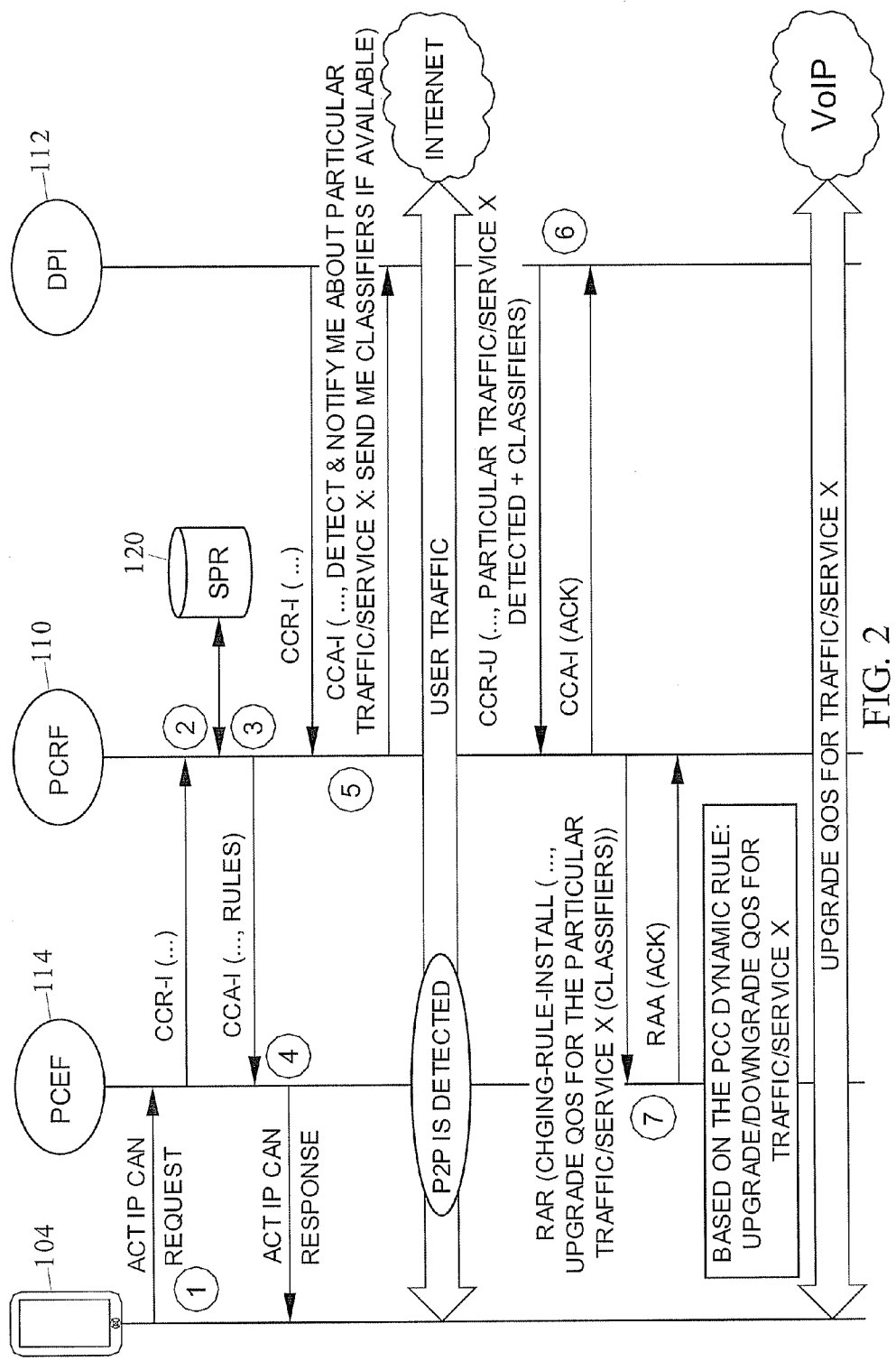
FIG. 2 is a message flow diagram illustrating an example of enhanced service detection and policy rule determination according to an embodiment of the subject matter described herein.

FIG. 2 is message flow diagram illustrating an exemplary method for enhanced service detection and policy rule determination according to an embodiment of the subject matter described herein. Referring to FIG. 2, in step 1, UE 104 attempts to attach to the network and the result is an IP connectivity access network (CAN) request message being sent to PCEF node 114. The IP CAN request is a message used to establish an IP CAN session. The IP CAN session can be used to provide a service to the user, such as a voice over IP phone call, website access, or other web-based service.

PCEF node 114 may be a GGSN or other node that controls user access in a particular geographic area. In response to receiving the IP CAN request message, PCEF node 114 sends a Diameter credit control request (CCR)-I (initial) message to PCRF node 110. The purpose of the CCR-I message is to determine whether to allow the user to access the network and the policy to be applied to the user.

In step 2, in response to receiving the CCR-I message, PCRF node 110 queries SPR 120 to determine the policies to be applied to the subscriber. In step 3, the PCRF node 110 sends a Diameter credit control answer (CCA)-I message to PCEF node 114 approving the subscriber's attachment to the network and communicating the policies to apply to the subscriber. In step 4, PCEF node 114 notifies UE 104 that the IP CAN session can be established.

DPI node 112 may monitor traffic between the access network and domain, such as the Internet. When DPI node 112 detects traffic from a new IP address, this may trigger DPI node 112 to notify PCRF node 110 of the detection and to request further instructions. Accordingly, in step 5, it is assumed that DPI node 112 has detected traffic with a new IP address, and, in response, DPI node 112 sends a Diameter CCR-I message to PCRF node 110 notifying PCRF node 110 of the traffic. PCRF node 110 may not know the specific service to which the traffic relates, but may request information from DPI node 112 regarding the specific service. Accordingly, PCRF node 110 sends a CCA-I message to DPI node 112 requesting that DPI node 112 notify PCRF node 110 about traffic relating to a specific service and requesting classifiers for that service if such classifiers are available. In one example, PCRF node 110 may request notification of voice over IP traffic concerning a specific user.

Upon receiving the request, DPI node 112 may map the service identifier in the request to traffic classifiers usable to detect traffic corresponding to the service using data such as that illustrated above in Table 2 and monitor traffic on the access network using the identified traffic classifiers. When DPI node 112 detects traffic matching the traffic classifiers, DPI node 112 may communicate this fact along with the traffic classifiers to PCRF node 110, as illustrated by the Diameter CCR-U (update) message in step 6. If the service is voice over IP service, the traffic classifiers may be the endpoint IP addresses and port numbers. Such classifiers can be determined from the session description protocol (SDP) signaling communicated over the access network and monitored by DPI node 112. Thus, in such a case, DPI node 112 takes a layer 5 or higher service identifier (e.g., "VoIP") and maps that service identifier to layer 3 and 4 traffic classifiers (e.g., the endpoint IP addresses and port numbers) that are communicated to PCRF node 110.

In another example, PCRF node 110 may request notification of traffic relating to a specific website, such as YouTube. DPI node 112 may map the service identifier "YouTube" to the IP address and port number or the URL used by UE 104 to contact the website. PCRF node 110, upon receiving the notification that the traffic has been detected and the classifiers, may dynamically formulate a policy rule based on the classifiers and may communicate the policy rule to PCEF node 114, as illustrated by the Diameter re-authentication request (RAR) message in step 7. The policy rule may be specific to the detected service. For example, the user may be granted a guaranteed bandwidth of 3 Mbps for the duration of the voice over IP call. In another example, the user may be granted free uploads or downloads up to a predetermined volume of traffic and then be required to pay for additional uploads or downloads once the amount of traffic relating to the specific service exceeds the volume threshold. PCEF node 114 installs the rule and may upgrade or downgrade the user's service based on the policy rule. In the illustrated example, the user traffic receives an upgrade from the previously provided quality of service based on the identity of the service.

Figure 3:
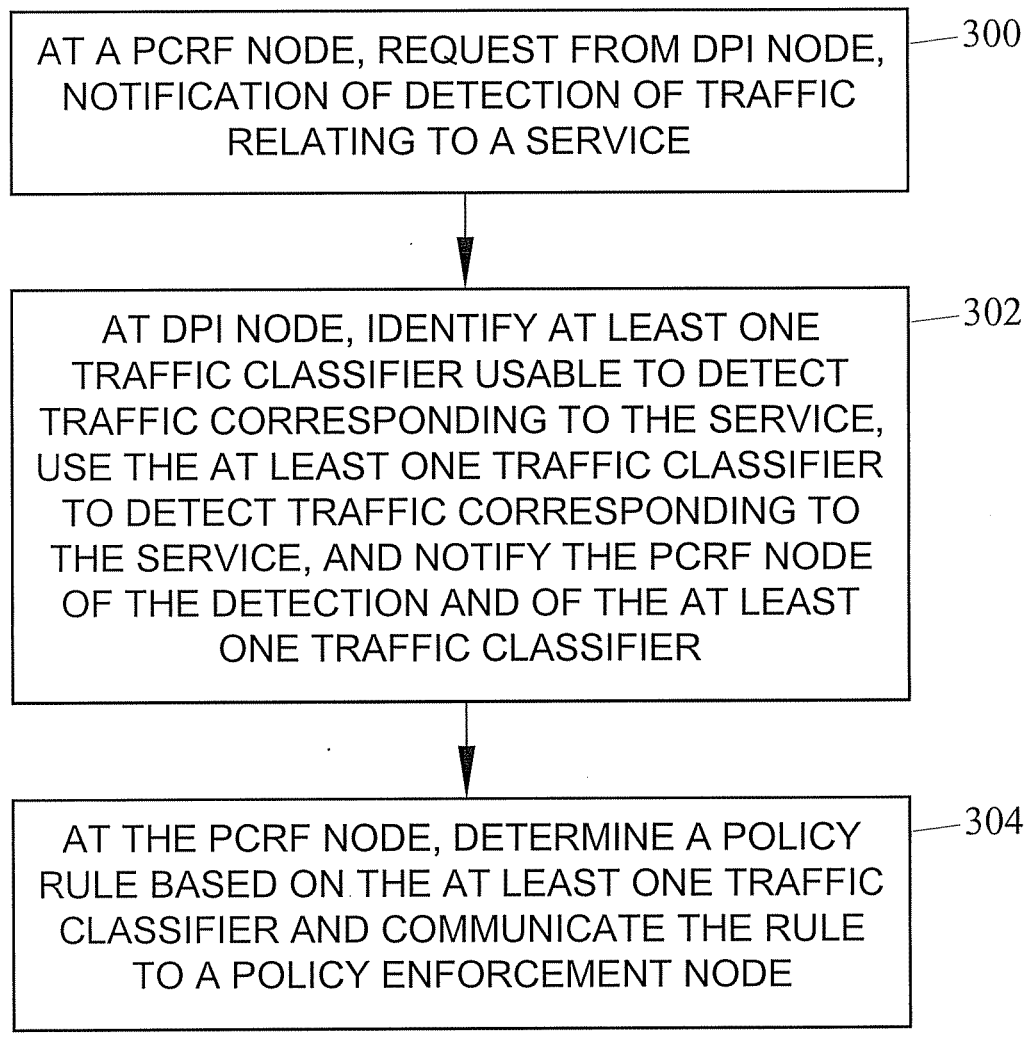
FIG. 3 is a flow chart illustrating an exemplary process for enhanced service detection and policy rule determination according to an embodiment of the subject matter described herein.

FIG. 3 is a flow chart illustrating exemplary overall steps of a method for enhanced service detection and policy rule determination according to an embodiment of the subject matter described herein. Referring to FIG. 3, in step 300, a PCRF node requests, from a DPI node, notification of detection of traffic relating to a service. For example, PCRF node 110 may request that DPI node 112 notify PCRF node 110 of the detection of traffic relating to a particular web application or service. The request may include a service identifier but not necessarily the traffic classifiers for detecting traffic relating to the service.

In step 302, the DPI node receives the request, identifies at least one traffic classifier usable to detect traffic corresponding to the service, uses the at least one traffic classifier to detect traffic corresponding to the service and notifies the PCRF node of the detection and of the at least one traffic classifiers. For example, DPI node 112 may map the service identifier received from PCRF node 110 into a signature to the traffic. The signature may include IP addresses and port numbers, URLs, or other signature. The signature may be dynamically determined through analysis of signaling messages relating to the service or statically determined using data stored by DPI node 112. DPI node 112 may use the signature to detect traffic relating to a service and to communicate an indication of the notification and at least some of the traffic classifiers to PCRF node 110.

In step 304, at the PCRF node, a policy rule specific to the service is determined and communicated to a policy enforcement node. For example, PCRF node 110 may dynamically formulate a policy rule specific to the detected service and communicate the policy rule to PCEF node 114. PCEF node 114 may then enhance, downgrade, or perform another action related to traffic for the particular service based on the policy rule received from PCRF node 110.

In the examples described above, DPI node 112 is shown as being separate from PCEF node 114. However, the subject matter described herein is not limited to having a DPI node that is separate from the PCEF node. In an alternate example, DPI node 112 may be integrated with PCEF node 114. In one exemplary configuration, PCEF node 114 may be a GGSN with an integrated DPI. In addition, the subject matter described herein is not limited to GGSNs that are not layer 5 and higher aware. The subject matter described herein can be used to provide enhanced service detection and policy rule determination can be implemented in combination with a GGSN or other policy rule enforcement node that is capable of analyzing data at any one or more of OSI layers 1-7.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for enhanced service detection, the method comprising:
   at a policy and charging rules function (PCRF) node, requesting, from a deep packet inspection (DPI) node, notification of detection of traffic relating to a service, wherein requesting notification of detection of traffic relating to the service includes communicating a service identifier from the PCRF node to the DPI node;
   at the DPI node, identifying at least one traffic classifier usable to detect traffic corresponding to the service, using the at least one traffic classifier to detect traffic corresponding to the service, and notifying the PCRF node of the detection and of the at least one traffic classifiers; and
   at the PCRF node, determining a policy rule based on the at least one classifier and communicating the policy rule to a policy enforcement node.

2. The method of claim 1 wherein the service comprises an open systems interconnect (OSI) layer 5 or higher service.

3. The method of claim 2 wherein the service includes a voice over IP telephone call, access to a specific website, or access to a web-based service.

4. The method of claim 1 wherein identifying at least one traffic classifier usable to detect traffic corresponding to the service comprises mapping the service identifier to the at least one traffic classifier.

5. The method of claim 1 wherein identifying at least one traffic classifier usable to detect traffic corresponding to the service includes accessing traffic classifiers statically provisioned in the DPI node.

6. The method of claim 1 wherein notifying the PCRF node of the at least one traffic classifier includes communicating at least one open systems interconnect (OSI) layer 5 or higher traffic classifier to the PCRF node.

7. The method of claim 1 wherein notifying the PCRF node of the at least one traffic classifier includes communicating at least one open systems interconnect (OSI) layer 4 or lower traffic classifier to the PCRF node.

8. The method of claim 1 wherein communicating the policy rule to a policy enforcement node includes communicating the policy rule to a gateway GPRS support node (GGSN).

9. The method of claim 8 wherein the DPI node is integrated with the GGSN.

10. The method of claim 8 wherein the DPI node is separate from the GGSN.

11. A method for enhanced service detection, the method comprising:
    at a policy and charging rules function (PCRF) node, requesting, from a deep packet inspection (DPI) node, notification of detection of traffic relating to a service;
    at the DPI node, identifying at least one traffic classifier usable to detect traffic corresponding to the service, using the at least one traffic classifier to detect traffic corresponding to the service, and notifying the PCRF node of the detection and of the at least one traffic classifiers; and
    at the PCRF node, determining a policy rule based on the at least one classifier and communicating the policy rule to a policy enforcement node, wherein identifying at least one traffic classifier usable to detect traffic corresponding to the service includes dynamically determining the at least one traffic classifier through monitoring and analysis of signaling messages associated with the service.

12. The method of claim 11 comprising continually monitoring and analyzing signaling messages associated with the service and updating the at least one traffic classifier associated with the service in response to detecting changes in the at least one traffic classifier.

13. A system for enhanced service detection, the system comprising:
    a policy and charging rules function (PCRF) node for requesting notification of detection of traffic relating to a service; and
    a deep packet inspection (DPI) node for receiving the request from the PCRF node, for identifying at least one traffic classifier usable to detect traffic corresponding to the service, for using the at least one traffic classifier to detect traffic corresponding to the service, and for notifying the PCRF node of the detection and of the at least one traffic classifier; and
    wherein the PCRF node, in response to receiving notification of detection of the traffic corresponding to the service and the at least one traffic classifier, determines a policy rule based on the at least one traffic classifier and communicates the policy rule to a policy enforcement node, and wherein requesting notification of detection of traffic relating to the service by the PCRF node includes communicating a service identifier from the PCRF node to the DPI node.

14. The system of claim 13 wherein the service comprises an open systems interconnect (OSI) layer 5 or higher service.

15. The system of claim 14 wherein the service includes a voice over IP telephone call, access to a specific website, or access to a specific web-based service.

16. The system of claim 13 wherein identifying the at least one traffic classifier comprises mapping the service identifier to the at least one traffic classifier.

17. The system of claim 13 wherein identifying the at least one traffic classifier associated with the service includes accessing traffic classifiers statically provisioned in the DPI node.

18. The system of claim 13 wherein notifying the PCRF node of the at least one of the traffic classifier includes communicating at least one open systems interconnect (OSI) layer 5 or higher traffic classifier to the PCRF node.

19. The system of claim 13 wherein notifying the PCRF node of the at least one traffic classifier includes communicating an open systems interconnect (OSI) layer 4 or lower traffic classifiers to the PCRF node.

20. The system of claim 13 wherein communicating the policy rule to a policy enforcement node includes communicating the policy rule to a gateway GPRS support node (GGSN).

21. The system of claim 20 wherein the DPI node is integrated with the GGSN.

22. The system of claim 20 wherein the DPI node is separate from the GGSN.

23. A system for enhanced service detection, the system comprising:
    a policy and charging rules function (PCRF) node for requesting notification of detection of traffic relating to a service; and
    a deep packet inspection (DPI) node for receiving the request from the PCRF node, for identifying at least one traffic classifier usable to detect traffic corresponding to the service, for using the at least one traffic classifier to detect traffic corresponding to the service, and for notifying the PCRF node of the detection and of the at least one traffic classifier; and
    wherein the PCRF node, in response to receiving notification of detection of the traffic corresponding to the service and the at least one traffic classifier, determines a policy rule based on the at least one traffic classifier and communicates the policy rule to a policy enforcement node, wherein identifying the at least one traffic classifier corresponding to the service includes dynamically determining the at least one traffic classifier through monitoring and analysis of signaling messages associated with the service.

24. The system of claim 23 comprising continually monitoring and analyzing signaling messages associated with the service and updating the at least one traffic classifier associated with the service in response to detecting changes in the at least one traffic classifier.

25. A non-transitory computer readable medium having stored thereon executable instructions that when executed by the processor of a computer control the computer to perform steps comprising:
    at a policy and charging rules function (PCRF) node, requesting, from a deep packet inspection (DPI) node, notification of detection of traffic relating to a service, wherein requesting notification of detection of traffic relating to the service includes communicating a service identifier from the PCRF node to the DPI node;

at the DPI node, identifying at least one traffic classifier usable to detect traffic corresponding to the service, using the at least one traffic classifier to detect traffic corresponding to the service, and notifying the PCRF node of the detection and of the at least one traffic classifier; and at the PCRF node, determining a policy rule based on the at least one traffic classifier and communicating the policy rule to a policy enforcement node.

* * * * *